US007068975B2

(12) United States Patent
Loner

(10) Patent No.: US 7,068,975 B2
(45) Date of Patent: Jun. 27, 2006

(54) SYSTEMS AND METHODS FOR SHARING UPLINK BANDWIDTH AMONG SATELLITES IN A COMMON ORBITAL SLOT

(75) Inventor: Patrick J. Loner, Hermosa Beach, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 578 days.

(21) Appl. No.: 10/305,490

(22) Filed: Nov. 26, 2002

(65) Prior Publication Data

US 2004/0102156 A1 May 27, 2004

(51) Int. Cl.
*H04B 7/185* (2006.01)
(52) U.S. Cl. .................... 455/12.1; 455/426; 455/13.3; 455/101
(58) Field of Classification Search .............. 455/445, 455/446, 447, 453, 12.1, 13.1, 101, 13.2, 455/13.3, 63.1, 427, 428, 429, 430
See application file for complete search history.

(56) References Cited

U.S. PATENT DOCUMENTS

| 3,916,408 | A | | 10/1975 | Evans et al. |
| 4,813,036 | A | | 3/1989 | Whitehead |
| 5,555,257 | A | | 9/1996 | Dent |
| 5,642,358 | A | | 6/1997 | Dent |
| 5,835,057 | A | | 11/1998 | Van Heyningen |
| 5,848,060 | A | | 12/1998 | Dent |
| 5,995,832 | A | * | 11/1999 | Mallinckrodt ............... 455/427 |
| 6,052,586 | A | * | 4/2000 | Karabinis .................... 455/427 |
| 6,125,261 | A | | 9/2000 | Anselmo et al. |
| 6,128,286 | A | | 10/2000 | Leopold et al. |
| 6,325,332 | B1 | * | 12/2001 | Cellier et al. ............ 244/158 R |
| 6,441,797 | B1 | | 8/2002 | Shah |
| 6,535,801 | B1 | * | 3/2003 | Geier et al. .................... 701/13 |
| 2002/0032003 | A1 | | 3/2002 | Avitzour et al. |
| 2002/0041575 | A1 | | 4/2002 | Karabinis et al. |
| 2002/0108116 | A1 | | 8/2002 | Dillon |
| 2002/0181604 | A1 | | 12/2002 | Chen |
| 2004/0110467 | A1 | * | 6/2004 | Wang ........................ 455/12.1 |

FOREIGN PATENT DOCUMENTS

| EP | 1148661 A | 10/2001 |
| WO | WO 02 41093 A | 5/2002 |

\* cited by examiner

*Primary Examiner*—Edan Orgad
(74) *Attorney, Agent, or Firm*—Georgann S. Grunebach

(57) ABSTRACT

A system for transmitting data to a plurality of satellites is provided. A first satellite in an orbital slot has an associated receive antenna, and is configured to receive signals in a first range of frequencies. A second satellite in the orbital slot has an associated receive antenna. The second satellite is separated from the first satellite by at least a first separation angle, and is configured to receive signals in the first range of frequencies. A first earth uplink antenna, located at a first earth location, is capable of transmitting a first uplink beam at the receive antenna of the first satellite. A second earth uplink antenna, collocated at the first earth location, is capable of transmitting a second uplink beam at the receive antenna of the second satellite. The first uplink beam includes first signals at the first range of frequencies, and the second uplink beam includes second signals at the first range of frequencies. Further, the first uplink beam is substantially attenuated beyond the first separation angle in the direction of the second satellite, and the second uplink beam is substantially attenuated beyond the first separation angle in the direction of the first satellite.

19 Claims, 7 Drawing Sheets

SYSTEMS AND METHODS FOR SHARING UPLINK BANDWIDTH AMONG SATELLITES IN A COMMON ORBITAL SLOT

FIELD OF THE DISCLOSURE

The present disclosure generally relates to satellite-based communication systems and, more particularly, to sharing uplink bandwidth among multiple satellites.

BACKGROUND

The International Telecommunications Union (ITU) has established guidelines for delivering communication signals from the ground to satellites in orbit (i.e., uplink signals), and for delivering communication signals from satellites to the ground (i.e., downlink signals). In particular, the ITU guidelines allocate a specific uplink frequency spectrum and downlink frequency spectrum for each orbital position (i.e., orbital slot). Thus, for a particular orbital slot, the spectrum bandwidth available for uplink and downlink signals is limited.

Some satellite-based communication systems utilize one or more satellites in one orbital slot to transmit communication signals received from the ground across a wide geographic area. In a typical system, one or more satellites receive communication signals from one or more ground stations (the uplink) via a receive antenna(s) onboard the satellite. These signals are then transmitted over a geographic area (the downlink) via a transmit antenna(s) onboard the satellite. In these systems, the amount of signals that can be handled by the system may be limited by the bandwidth of the spectrum allocated by the ITU for the uplink and/or downlink.

One technique to expand the effective bandwidth of a downlink is to "reuse" some or all of the frequencies in the allocated downlink frequency spectrum. One example of such a system is a "spot beam" satellite system. In such systems, a satellite is capable of transmitting a plurality of spot beams to the ground, where each spot beam illuminates a different "spot" on the ground. If two ground spots are spatially separated, the same frequencies can be reused in the two spots without causing interference. By reusing the spectrum in this way, the effective spectral bandwidth of the downlink can be expanded from the ITU spectrum bandwidth allocation.

But, in order to utilize this expanded spectral bandwidth of the downlink, an equivalent spectral bandwidth should be provided to the satellite via the uplink (assuming a similar signaling format between communication signals in the uplink and downlink). What are needed are techniques for expanding the effective spectral bandwidth of satellite uplinks.

SUMMARY OF THE INVENTION

In one embodiment according to the present invention, a satellite-based communication system is provided. The system comprises a first satellite in an orbital slot, the first satellite having an associated receive antenna, wherein the first satellite is configured to receive signals in a first range of frequencies. The system also comprises a second satellite in the orbital slot, the second satellite having an associated receive antenna, wherein the second satellite is separated from the first satellite by at least a first separation angle, and wherein the second satellite is configured to receive signals in the first range of frequencies. The system additionally comprises a first earth uplink antenna, located at a first earth location, capable of transmitting a first uplink beam at the receive antenna of the first satellite, and a second earth uplink antenna, collocated at the first earth location, capable of transmitting a second uplink beam at the receive antenna of the second satellite. The first uplink beam includes first signals at the first range of frequencies, and the second uplink beam includes second signals at the first range of frequencies. Further, the first uplink beam is substantially attenuated beyond the first separation angle in the direction of the second satellite, and the second uplink beam is substantially attenuated beyond the first separation angle in the direction of the first satellite.

In another embodiment, a system for transmitting data to a plurality of satellites is provided. The system includes a first earth uplink antenna, located at a first earth location, capable of transmitting a first uplink beam at a receive antenna of a first satellite, the first satellite in a first position in an orbital slot, and a second earth uplink antenna, collocated at the first earth location, capable of transmitting a second uplink beam at a receive antenna of a second satellite, the second satellite in a second position in the orbital slot, wherein the second satellite is separated from the first satellite by at least a separation angle. The first uplink beam includes first signals at a first range of frequencies, and wherein the second uplink beam includes second signals at the range of frequencies, and the first uplink beam is substantially attenuated beyond the separation angle in the direction of the second satellite, and wherein the second uplink beam is substantially attenuated beyond the separation angle in the direction of the first satellite.

In yet another embodiment, a method for transmitting data to the satellites, in a satellite-based communications network including a plurality of satellites, each satellite having an uplink antenna, a method for transmitting data to the satellites, is provided. The method comprises transmitting a first uplink beam at a receive antenna of a first satellite, wherein the first satellite is at a first position in an orbital slot, wherein a second satellite is at a second position in the orbital slot, wherein the second satellite is separated from the first satellite by at least a separation angle, wherein the first uplink beam is substantially attenuated beyond the separation angle in the direction of the second satellite, and wherein the first uplink beam includes first signals at a first range of frequencies. The method also comprises transmitting a second uplink beam at a receive antenna of the second satellite, wherein the second uplink beam is substantially attenuated beyond the separation angle in the direction of the first satellite, and wherein the second uplink beam includes second signals at the first range of frequencies.

DESCRIPTION OF SPECIFIC EMBODIMENTS

Terms

A brief explanation of the meaning and scope of various terms used in the present disclosure is provided below.

As described above, ITU guidelines allocate a specific uplink frequency spectrum and downlink frequency spectrum for each orbital slot. Also as described above, satellites capable of transmitting spot beams can be used to effectively expand the spectral bandwidth of a downlink by reusing some or all of the frequencies in the allocated downlink spectrum. The effective expanded spectral bandwidth as a result of spectrum reuse will be referred to herein as the "cumulative spectral bandwidth."

When communicating with a satellite, the ITU allocated frequency spectrum for a downlink or uplink is typically partitioned into a plurality of "channels," where each channel is a subset of the allocated spectrum that does not overlap with other channels. Sometimes multiple channels may share the same subset of the spectrum, with each channel having a different polarization, modulation, etc., that permits the different channels to be discriminated.

Expanding Uplink Spectral Bandwidth Using Highly Focused Uplink Beams

Figure 1:
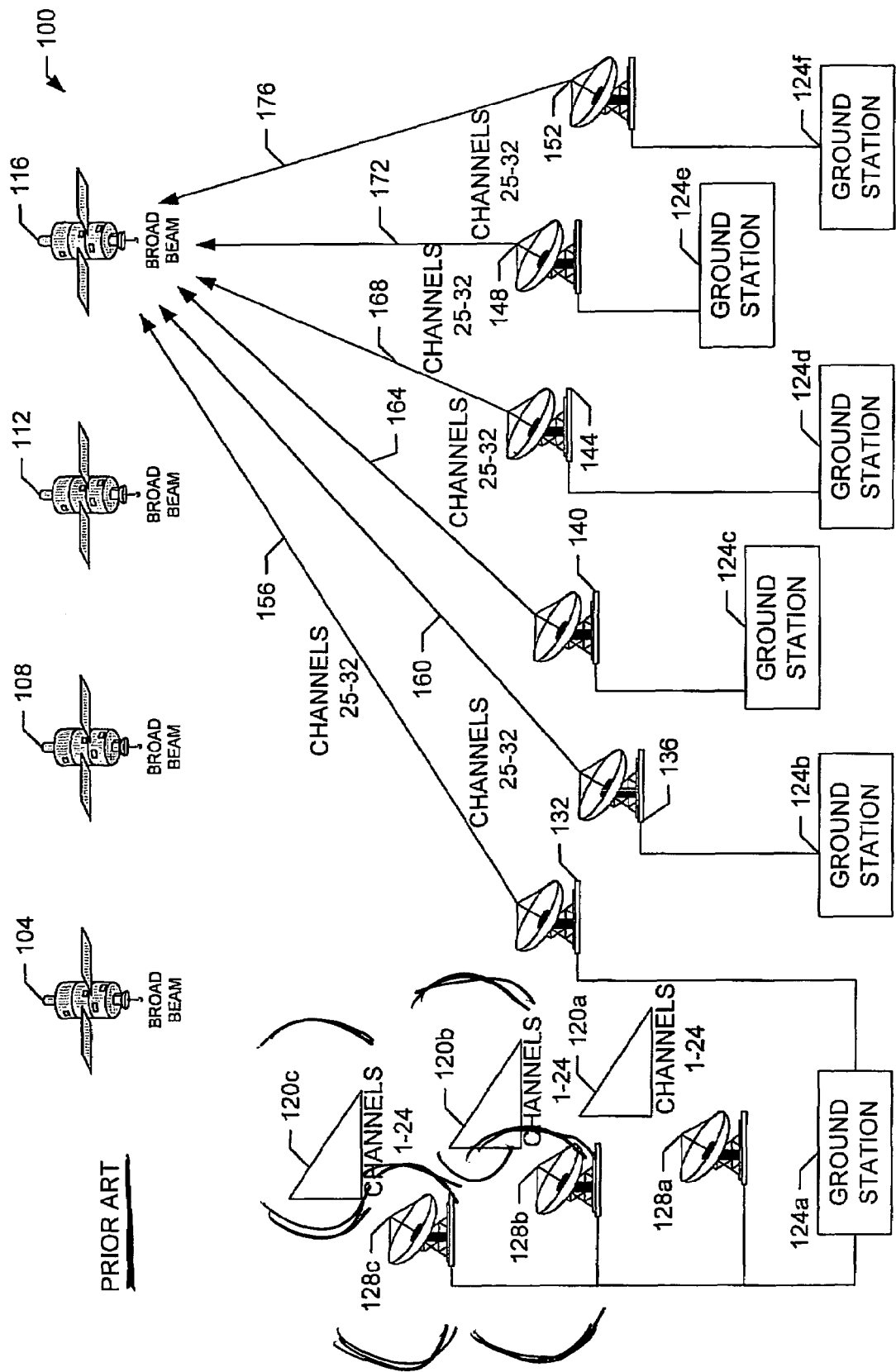
FIG. 1 is a simplified block diagram of a satellite-based communication system that utilizes frequency reuse for uplink signals via multiple spatially isolated ground stations.

One possible technique for expanding the effective spectral bandwidth of an uplink is to use reuse uplink frequencies using highly focused uplink beams transmitted from multiple spatially isolated ground stations. FIG. 1 is a simplified block diagram illustrating an example of a satellite-based communication system in which highly focused uplink beams transmitted from multiple spatially isolated ground stations are used to increase the effective spectral bandwidth (i.e., the "cumulative spectral bandwidth"). The system includes four satellites, 104, 108, 112, and 116. In this example, the receive and transmit patterns of satellites 104, 108, and 112 are broad beam. As a specific example, the receive and transmit patterns of these satellites could be capable of substantially covering the continental United States (i.e., a "CONUS pattern"). Satellite 116, on the other hand, is capable of receiving highly focused uplink beams and transmitting spot beams. Particularly, the receive antenna of satellite 116 is capable of discriminating between multiple highly focused uplink beams that share the same frequency spectrum, but that originate from spatially isolated uplink antennas on the ground.

All of satellites 104, 108, 112, and 116 are located within one orbital slot. Thus, according to the ITU guidelines, the spectrum available to these satellites for reception and transmission is limited to a particular range of frequencies. For example, the spectrum available to the satellites 104, 108, 112, and 116 for reception (uplink) could be limited to a particular frequency spectrum. In a specific embodiment, this frequency spectrum is partitioned into 32 channels. Broad beam satellites 104, 108, and 112 each are capable of transmitting 8 channels (downlink), and thus, each of satellites 104, 108, and 112 is assigned 8 channels of the uplink spectrum. These 24 channels can be broadcast to satellites 104, 108, and 112 via uplink beams 120a–120c, which are transmitted by ground station 124a using uplink antennas 128a–128c corresponding to receive antennas on satellites 104, 108, and 112, respectively.

Continuing with this example, spot beam satellite 116 could be capable of transmitting 44 channels. However, because 24 uplink channels are already accounted for by satellites 104, 108, and 112, only 8 uplink channels are available to spot beam satellite 116. Six spatially isolated uplink beam earth antennas 132, 136, 140, 144, 148, and 152, can be used to transmit communication signals to satellite 116 via highly focused beams 156, 160, 164, 168, 172, and 176, respectively. In this way, the remaining 8 uplink channels can be reused to supply satellite 116 with 44 channels of content.

A disadvantage of the system illustrated in FIG. 1 is that five additional earth uplink ground stations 124b, 124c, 124d, 124e, and 124f are required. Establishing these additional earth uplink ground stations can present a substantial cost. Additionally, these additional earth uplink ground stations can present substantial ongoing operational costs.

Reusing Spectrum Amongst Multiple Satellites

Figure 2:
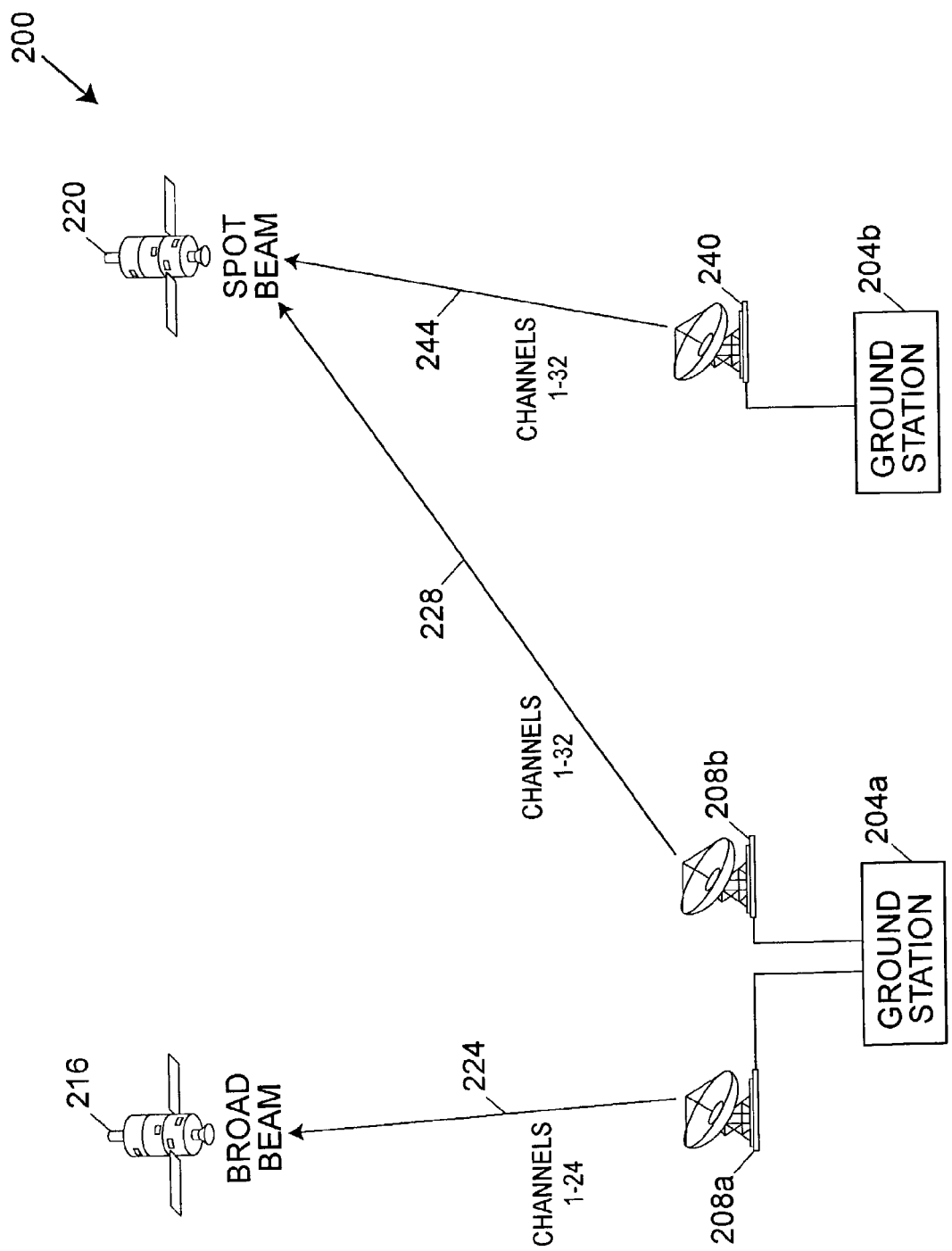
FIG. 2 is a simplified block diagram of one embodiment of a satellite-based communication system according to the present invention.

FIG. 2 is a simplified block diagram illustrating one embodiment of a satellite-based communication system according to the present invention. System 200 includes a ground station 204a, collocated uplink antennas 208a and 208b, and satellites 216 and 220. Each of satellites 216 and 220 include a respective receive antenna. Ground station 204a may also transmit, via uplink antennas 208a and 208b, control signals for maintaining satellites 216 and 220 in a common orbital slot.

In this specific embodiment, the receive antenna of satellite 216 has a broad beam receive pattern, and the receive antenna of satellite 220 is capable of discriminating between multiple highly focused uplink beams that share the same frequencies, but that each originate from an antenna spatially isolated from the other antennas. In this embodiment, the receive antenna may comprise a single antenna or a plurality of antennas as is well known to those of ordinary skill in the art. In other embodiments, the receive antennas of satellites 216 and 220 can be both broad beam, or both capable of discriminating between multiple highly focused uplink beams that share the same frequencies, but that each originate from an antenna spatially isolated from the other antennas. Also, in this specific embodiment, the transmit antenna of satellite 216 has a broad beam pattern, and the satellite 220 is capable of transmitting multiple spot beams. In other embodiments, both satellites 216 and 220 may be capable of transmitting broad beam patterns, or both be capable of transmitting multiple spot beams.

Figure 3:
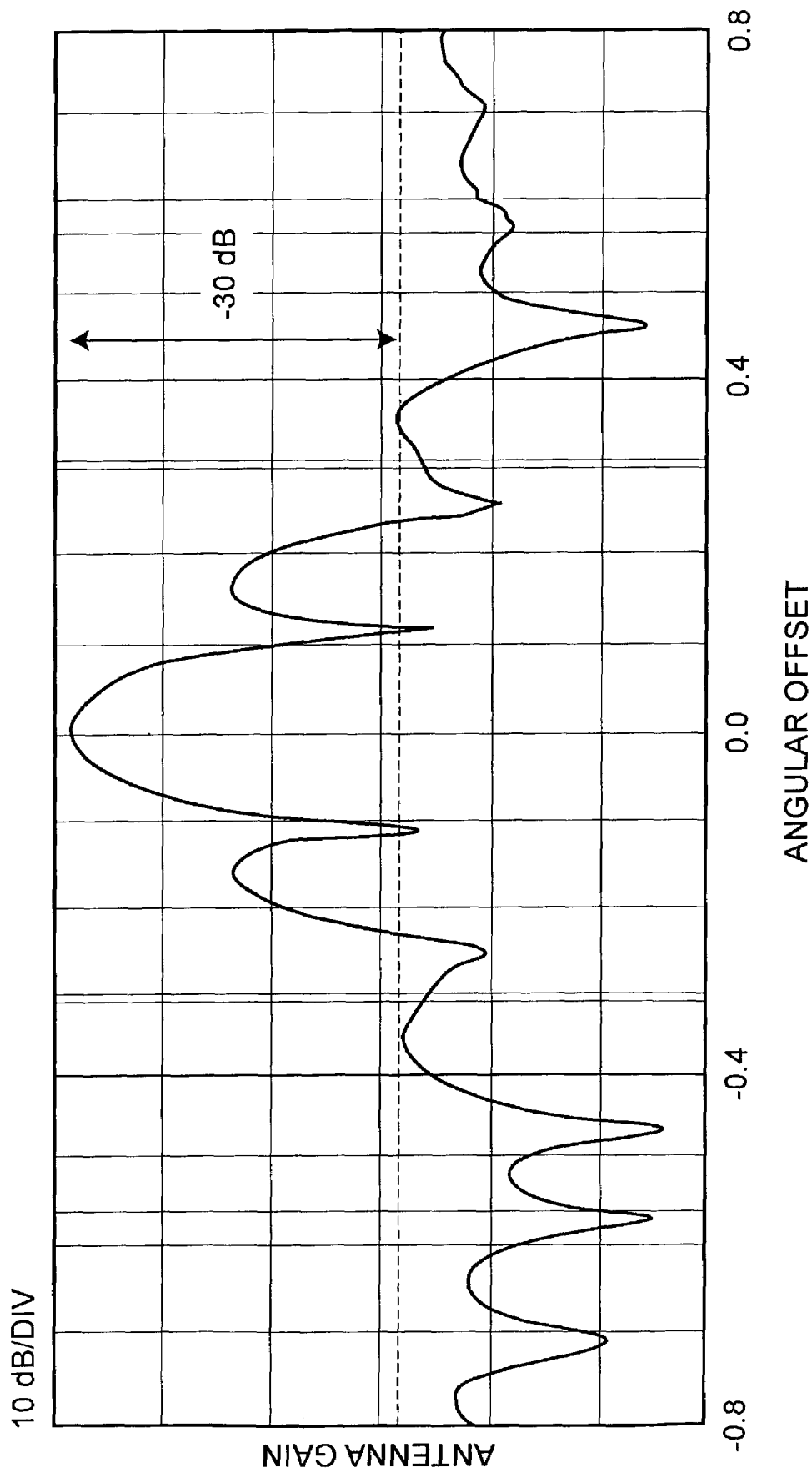
FIG. 3 is a graph of antenna gain versus offset angle for one specific example of an uplink transmission antenna that can be used in embodiments according to the present invention.

Uplink antenna 208a transmits a first set of communication signals to satellite 216 via highly focused uplink beam 224, and uplink antenna 208b transmits a second set of communication signals to satellite 220 via highly focused uplink beam 228. FIG. 3 is a graph illustrating antenna gain of one specific embodiment of uplink antenna 208. In particular, FIG. 3 generally illustrates the antenna gain of antennas 208a and 208b, versus angular offset as viewed from the earth's surface. As can be seen in FIG. 3, the antenna gain for antennas 208a and 208b that transmit highly focused beams 224 and 228 is −30 dB or lower for angular offsets greater than 0.25° (and less than −0.25°). In this embodiment, uplink antennas 208a and 208b have diameters of approximately 13 meters, which is typical of many broadcast satellite systems.

Referring again to FIG. 2, it has been found that in the reception of highly focused uplink beam 224 by satellite 216, if interference due to highly focused uplink beam 228 is less than or equal to −30 dB, the clear sky margin of the link that includes uplink 224 is impacted by less than 0.1 dB. Similarly, in the reception of highly focused uplink beam 228 by satellite 220, if interference due to highly focused uplink beam 224 is less than or equal to −30 dB, the clear sky margin of the link that includes uplink 228 is impacted by less than 0.1 dB. As described above, the antenna gain of antennas 208a and 208b is −30 dB or lower for angular positions greater than approximately 0.25°. Thus, if satellites 216 and 220 can be maintained at an angular separation greater than 0.25° (as viewed from the earth's surface), the same channels can be used in highly focused uplink beams 224 and 228 with little interference.

The angular position after which the received signal strength is below a threshold found to cause acceptable levels of interference can be referred to as the "cut-off angle" of the antenna. In the example described above, 0.25° can be referred to as the cut-off angle. It is to be understood, however, that the cut-off angle for a particular antenna can vary upon the specific implementation. For instance, different antennas may have a larger or smaller angle at which the received signal strength is less than −30 dB. Additionally, received signal strength of a particular antenna may not be symmetric about 0° offset. Moreover, some implementations may permit higher or lower levels of interference than others. Thus, in some embodiments, the cut-off angle may be the angle at which the interfering signal is below −20 dB, −25 dB, −35 dB, −40 dB, etc.

Figure 4:
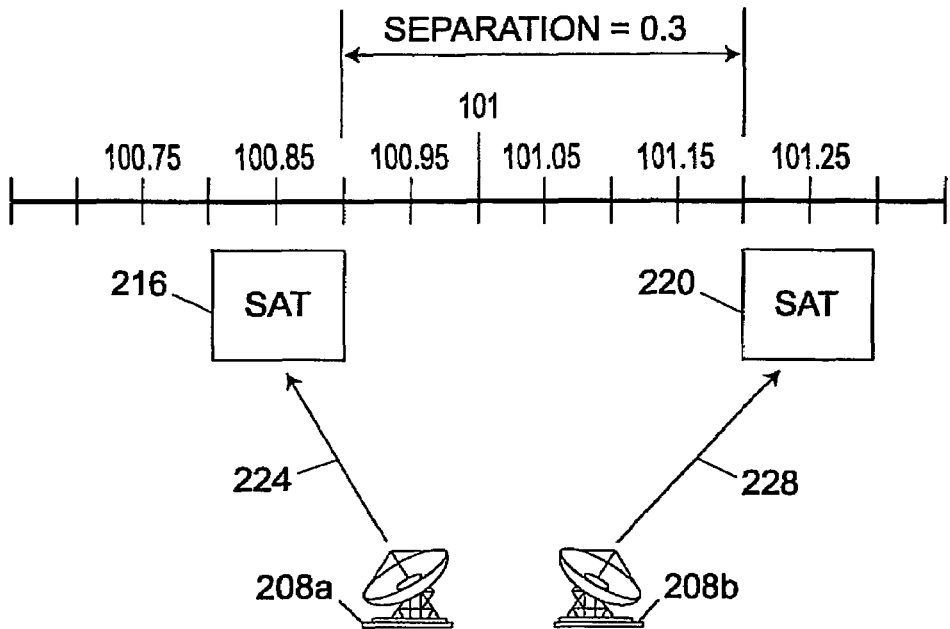
FIG. 4 is a simplified block diagram of one example of satellite positioning that can be used in embodiments according to the present invention.

FIG. 4 is a simplified diagram illustrating one specific example of satellite positioning in an orbital slot that can be utilized in embodiments according to the present invention. In particular, FIG. 4 illustrates an example in which satellites 216 and 220 are positioned within orbital slot 101 West. In this example, satellite 216 is nominally positioned at 100.85° (on-orbit), and satellite 220 is nominally positioned at 101.25° (on-orbit).

In this example, the nominal on-orbit separation of satellites 216 and 220 is:

$$\text{nominal on-orbit separation} = 101.25° - 100.85° = 0.40°. \quad (1)$$

It has been found that the present state of the art allows for maintaining satellites in position (i.e., "station-keeping" offset) to an accuracy of 0.05°. This station-keeping offset error is illustrated in FIG. 4 by representing satellites 216 and 220 as boxes. For instance, satellite 216 is nominally positioned at 100.85°, but can vary in position by ±0.05°. Taking into account station-keeping offsets, the worst-case on-orbit separation of satellites 216 and 220 is:

$$\text{worst case on-orbit separation} = 0.40° - 2(0.05°) = 0.30°. \quad (2)$$

An on-orbit angular separation can be converted to an angular separation as viewed from earth by multiplying the on-orbit angular separation by the topocentric factor (approximately 1.1). Thus, the worst case separation as view from earth is:

$$\text{worst case separation} = 1.1 * 0.30° = 0.33°. \quad (3)$$

It has been found that the earth antennas 208a and 208b may have a worst case angular pointing error of 0.03°. Thus, the worst case separation plus earth antenna error is:

$$\text{worst case separation plus antenna error} = 0.33° - 0.03° = 0.30°. \quad (4)$$

Thus, if satellite 216 is nominally positioned at 100.85° and satellite 220 is nominally positioned at 101.25°, it has been found that the worst case separation of the two satellites (taking into account pointing errors of earth antenna 208) is 0.30°. As discussed with respect to FIG. 3, this amount of separation should permit the same channels to be used in highly focused uplink beams 224 and 228 with little interference. Thus, highly focused uplink beams 224 and 228 can share some or all of the same channels.

It is to be understood that FIG. 4 illustrates merely one example of satellite positioning for one specific embodiment. In this embodiment as well as in other embodiments, the satellites may be maintained at different positions. For instance, the satellites can be offset from the positions shown in FIG. 4, positioned closer together, farther apart, etc. Moreover, in other embodiments the satellites can be positioned in an orbital slot other than 101 West.

Referring again to FIG. 2, system 200 permits frequency spectrum reuse between satellites 216 and 220 when their angular separation is greater than the cut-off angles of antennas 208a and 208b. Thus, the ITU allocated spectral bandwidth for the uplink, in effect, can be expanded.

In embodiments in which the receive antenna of satellite 220 is capable of receiving and discriminating uplink beams transmitted from multiple spatially isolated uplink earth antennas, system 200 may optionally include one or more additional uplink earth antennas 240 coupled to one or more respective ground stations 204b. The one or more earth antennas 240 should be spatially separated from the antennas 208a and 208b, and from each other. If uplink earth antenna 240 has characteristics similar to that of uplink earth antennas 208a and 208b, uplink earth antenna 240 can be used to transmit a highly focused uplink beam 244 that can reuse channels in highly focused uplink beams 224 and/or 228. In this way, the ITU allocated spectral bandwidth for the uplink, in effect, can be expanded further.

Figure 5:
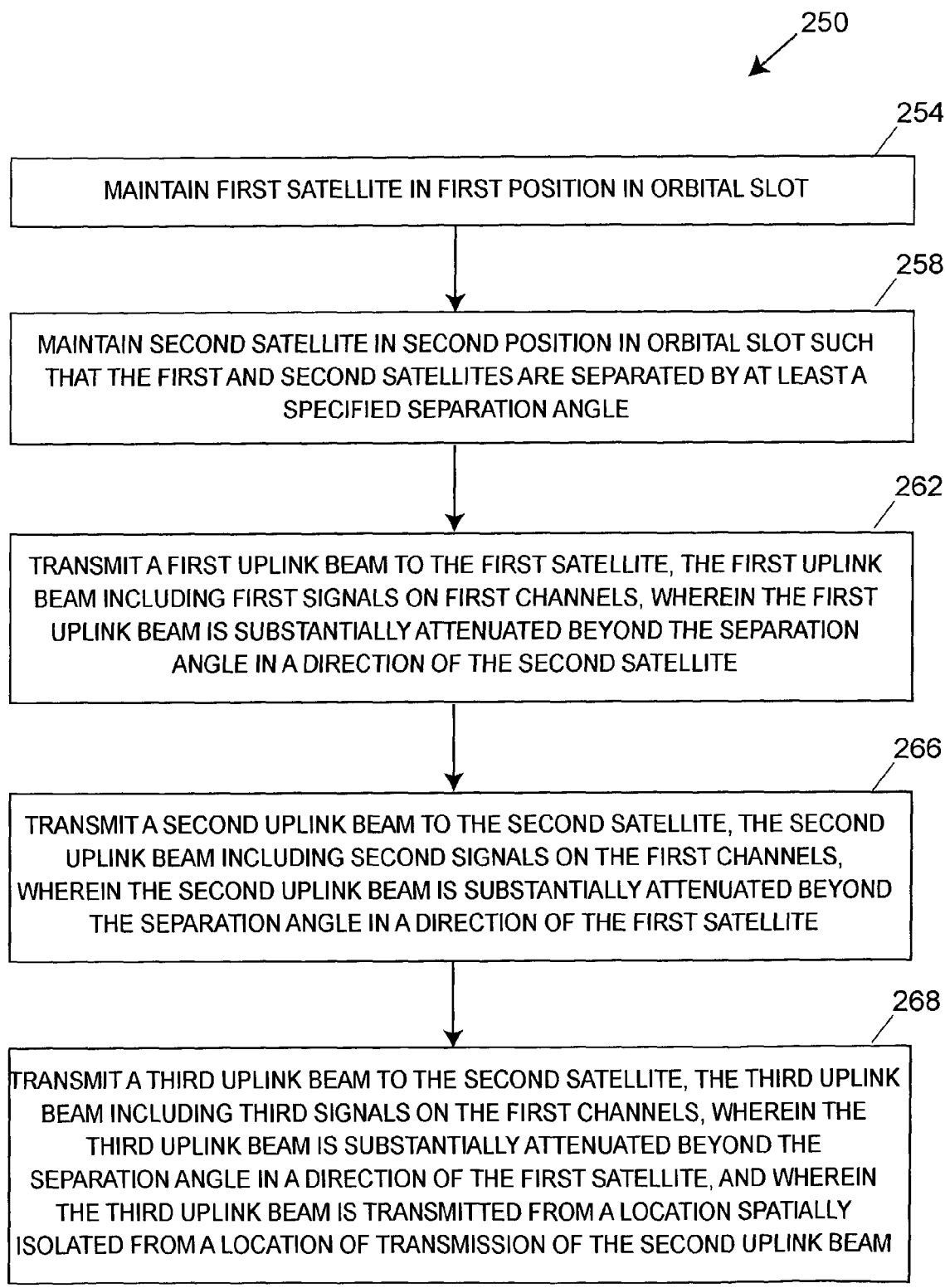
FIG. 5 is a simplified flow diagram of one embodiment of a method according to the present invention.

FIG. 5 is a simplified flow diagram illustrating one embodiment of a method 250 for transmitting data to multiple satellites according to the present invention. The flow of FIG. 5 will be described with reference to FIGS. 2–4. In step 254, a first satellite is maintained in a first position in an orbital slot. For example, in the system 200 described with reference to FIGS. 2–4, ground station 204a can maintain satellite 216 in position 100.85°, within orbital slot 101 West. In step 258, a second satellite is maintained in a second position in the orbital slot, such that the first and second satellites are separated by at least a specified separation angle. For example, in system 200, ground station 204a can maintain satellite 220 in position 101.25°, within orbital slot 101 West. As described above, this positioning maintains satellites 216 and 220 such that the worst case separation angle is 0.30°.

In step 262, a first highly focused uplink beam is transmitted to the first satellite, where the first highly focused uplink beam includes first communication signals on a first set of channels. Additionally, the first highly focused uplink beam is substantially attenuated beyond the separation angle in the direction of the second satellite. In system 200, a first highly focused uplink beam 224 can be transmitted to satellite 216 via antenna 208a. Highly focused uplink beam 224 can include a first set of channels. As described with reference to FIGS. 3 and 4, highly focused uplink beam 224 is substantially attenuated beyond 0.25° in the direction of satellite 220.

In step 266, a second highly focused uplink beam is transmitted to the second satellite, where the second highly focused uplink beam includes second communication signals on the first set of channels. Additionally, the second highly focused uplink beam is substantially attenuated beyond the separation angle in the direction of the first satellite. In system 200, a second highly focused uplink beam 228 can be transmitted to satellite 220 via antenna 208b. Highly focused uplink beam 228 can include the first set of channels. As described with reference to FIGS. 3 and 4, highly focused uplink beam 228 is substantially attenuated beyond 0.25° in the direction of satellite 216.

In optional step 268, a third highly focused uplink beam is transmitted to the second satellite, where the third highly focused uplink beam includes third communication signals on the first set of channels. The third highly focused uplink beam is substantially attenuated beyond the separation angle in the direction of the first satellite. Additionally, the third highly focused uplink beam is transmitted from a location that is spatially separated from the location of the transmission of the second highly focused uplink beam. In system 200, a third highly focused uplink beam 244 can be transmitted to satellite 220 via antenna 240. Antenna 240 should be spatially isolated from antenna 208b such that satellite 220 can discriminate between highly focused uplink beam 228 and highly focused uplink beam 244. Highly focused uplink beam 244 can include the first set of channels. As described with reference to FIGS. 3 and 4, highly focused uplink beam 244 is substantially attenuated beyond 0.25° in the direction of satellite 216.

An Example with Four Satellites

Figure 6:
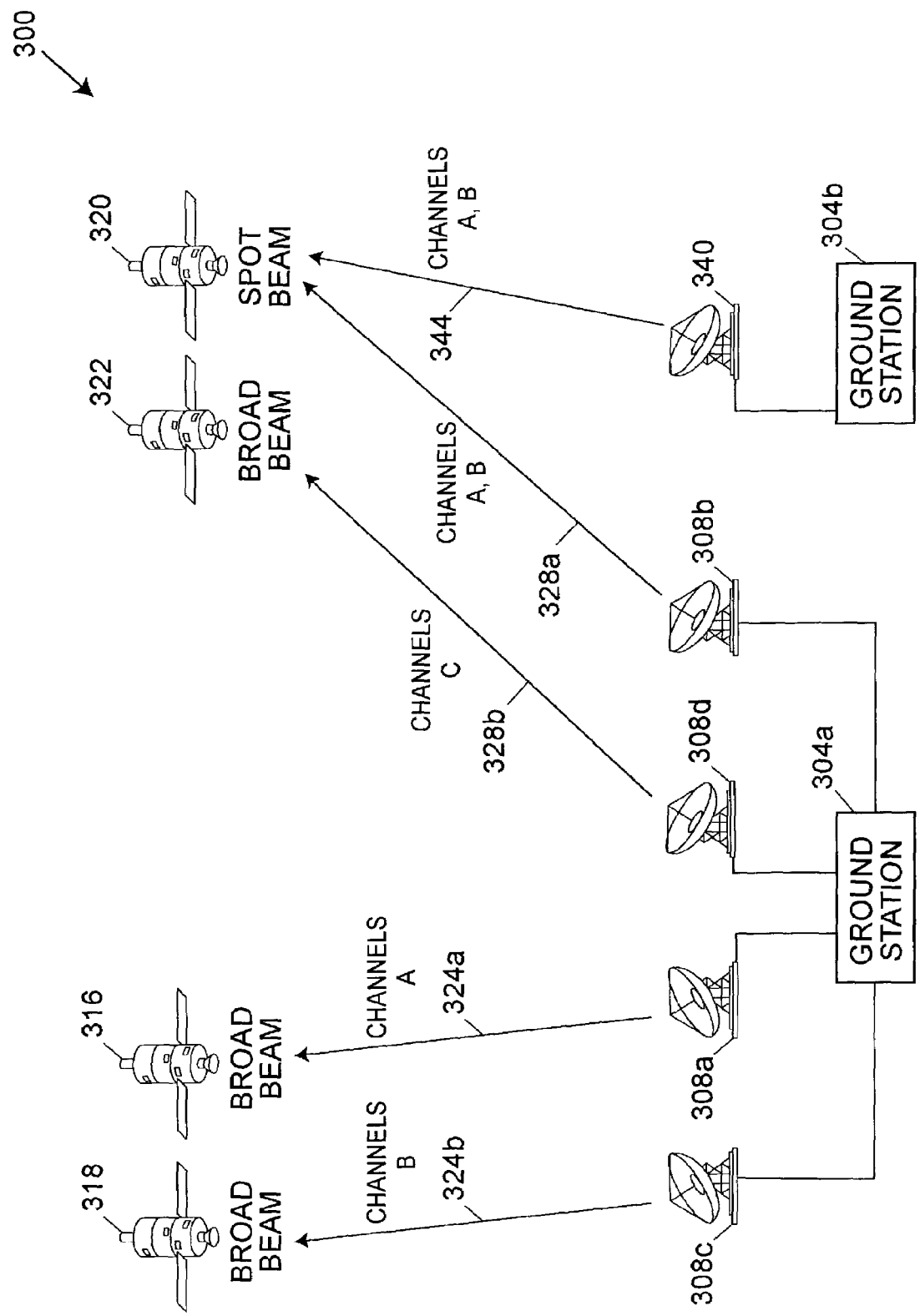
FIG. 6 is a simplified block diagram of another embodiment of a satellite-based communication system according to the present invention.

FIG. 6 is a simplified block diagram of another embodiment of a satellite-based communication system according to the present invention. System 300 includes a ground station 304a and collocated uplink antennas 308a, 308b, 308c, and 308d, and satellites 316, 318, 320, and 322. Each of satellites 316, 318, 320, and 322 include a respective receive antenna. Ground station 304a may transmit, via antennas 308a, 308b, 308c, and 308d, respective control signals for maintaining satellites 316, 318, 320, and 322 in a common orbital slot.

In this specific embodiment, the receive antennas of satellites 316, 318, and 322 each have a broad beam receive pattern, and the receive antenna of satellite 320 is capable of discriminating between multiple uplink beams transmitted from spatially isolated ground stations. In other embodiments, the receive antennas of satellites 316, 318, 320 and 322 can be all broad beam, all capable of discriminating between multiple uplink beams transmitted from spatially isolated ground stations, two broad beam and two capable of discriminating between multiple uplink beams transmitted from spatially isolated ground stations, etc. In this specific embodiment, satellites 316, 318, and 322 are capable of transmitting broad beam patterns, and satellite 320 is capable of transmitting multiple spot beams. In other embodiments, all of the satellites 316, 318, 320 and 322 may be capable of transmitting broad beam patterns, all of the satellites 316, 318, 320 and 322 may be capable of transmitting multiple spot beams, two of the satellites 316, 318, 320 and 322 may be capable of transmitting broad beam patterns and two may be capable of transmitting multiple spot beams, etc.

In this specific embodiment, uplink earth antennas 308a, 308b, 308c, and 308d each exhibit an antenna gain similar to that shown in FIG. 3. Uplink antenna 308a transmits a first set of communication signals to satellite 316 via a highly focused uplink beam 324a. Uplink antenna 308b transmits a second set of communication signals to satellite 320 via a highly focused uplink beam 328a. Uplink antenna 308c transmits a third set of communication signals to satellite 318 via a highly focused uplink beam 324b. Uplink antenna 308d transmits a fourth set of communication signals to satellite 322 via a highly focused uplink beam 328b.

Figure 7:
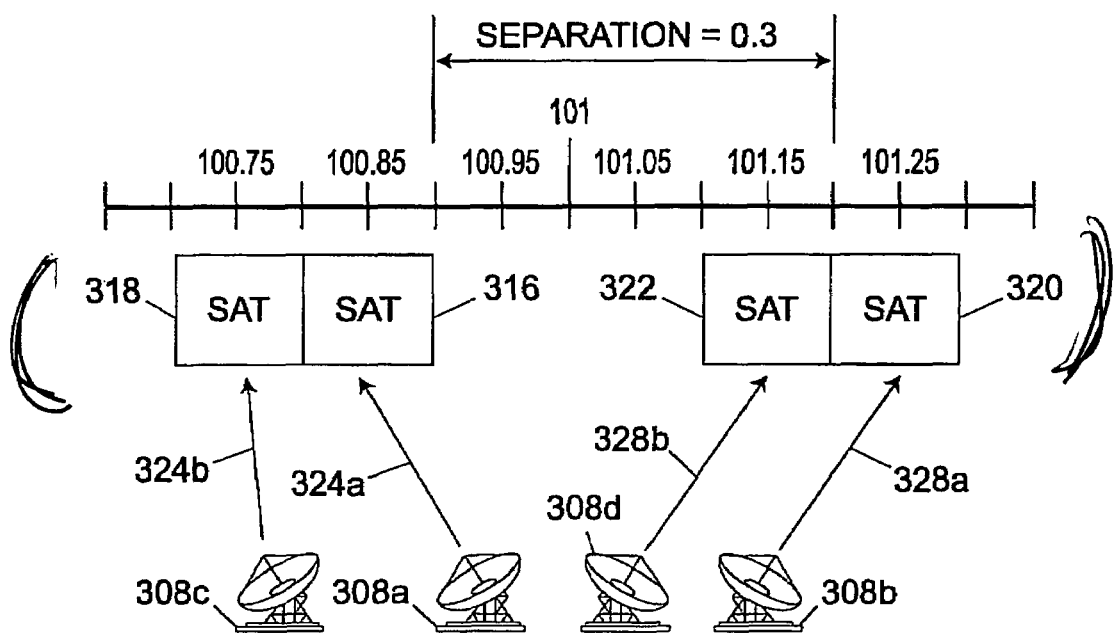
FIG. 7 is a simplified block diagram of another example of satellite positioning that can be used in embodiments according to the present invention.

FIG. 7 is a simplified diagram illustrating one specific example of satellite positioning in an orbital slot that can be utilized in embodiments according to the present invention. In particular, FIG. 7 illustrates an example in which satellites 316, 318, 320, and 322 are positioned within orbital slot 101 West. In this example, satellite 316 is nominally positioned at 100.85° (on-orbit), and satellite 318 is nominally positioned at 100.75° (on-orbit). Additionally, satellite. 320 is nominally positioned at 101.25° (on-orbit), and satellite 322 is nominally positioned at 101.15° (on-orbit).

It is to be understood that FIG. 7 illustrates merely one example of satellite positioning for one specific embodiment. In this embodiment as well as in other embodiments, the satellites may be maintained at different positions. For instance, the satellites can be offset from the positions shown in FIG. 7, positioned closer together, farther apart, etc. Moreover, in other embodiments the satellites can be positioned in an orbital slot other than 101 West.

Referring now to FIGS. 4 and 7, satellites 316 and 320 of FIG. 7 are nominally positioned at the same positions of satellites 216 and 220, respectively, of FIG. 4. Thus, satellites 316 and 320 of FIG. 7 have the same worst case angular separation as satellites 216 and 220 of FIG. 6 (i.e., 0.30°). As discussed with respect to FIG. 3, this amount of separation should permit the sharing of frequencies between satellites 316 and 320. Similarly, satellites 318 and 322 are positioned such that they also have a worst case angular separation of 0.30°.

As can be seen in FIG. 7, satellites 316 and 318 are positioned proximate to one another. In this embodiment, in highly focused uplink beam 324a may be used to transmit a subset of channels A to satellite 316, and highly focused uplink beam 324b may be used to transmit a subset of channels B to satellite 318.

The angular offsets between satellite 320 and satellite 316, and between satellite 320 and satellite 318 are greater than the cut-off angle of antenna 308. On the other hand, the angular offset between satellite 322 and satellite 316, however, is less than the cut-off angle of antenna 308. Therefore, frequency channels A and B of highly focused uplink beams 324a and 324b can be reused in highly focused uplink beam 328a to communicate with satellite 320, but should not be reused to communicate with satellite 322. Thus, in highly focused uplink beam 328a, the subsets of channels A and B may be designated for transmitting to satellite 320.

Similarly, satellites 320 and 322 are positioned proximate to one another. Therefore, in this embodiment, high focused uplink beam 328b includes a subset C of channels, separate from subsets channels A and B, designated for satellite 322.

As described above, channels subset A can be used in both highly focused uplink beams 324a and 328a, and channels subset B can be used in both highly focused uplink beams 324b and 328a. In this way, the ITU allocated spectrum bandwidth for the uplink can, in effect, be expanded.

In embodiments in which satellite 320 is capable of receiving and discriminating multiple highly focused uplink beams, system 300 may optionally include one or more additional uplink earth antennas 340 coupled to one or more respective ground stations 304b. The one or more earth antennas 340 should be spatially separated from the antenna 308b, and from each other. If uplink earth antenna 340 has characteristics similar to that of uplink earth antenna 308, uplink earth antenna 340 can be used to transmit a highly focused uplink beam 344 that can reuse frequencies designated for satellite 320. For example, highly focused uplink beam 344 may include any of channels subsets A and B. In this way, the ITU allocated spectrum bandwidth for the uplink can, in effect be expanded further.

Another specific embodiment will now be described with respect to FIG. 6 and will be compared with the system described with reference to FIG. 1. In this embodiment, satellites 316, 318, 320, and 322 are positioned as described with reference to FIG. 7, and uplink earth antennas 308*a*, 308*b*, 308*c*, 308*d*, and 340 exhibit characteristics as described with reference to FIG. 3. As with the example described with reference to FIG. 1, the orbital slot is assigned an uplink frequency spectrum which may be allocated into 32 channels (which will hereinafter be referred to by number).

In this embodiment, highly focused uplink beam 324*a* includes channels 1–8 designated for satellite 316, and highly focused uplink beam 324*b* includes channels 9–16 designated for satellite 318. Highly focused uplink beam 328*a* includes channels 1–16 designated for satellite 320. Additionally, highly focused uplink beam 328*b* includes channels 17–24 designated for satellite 322. Highly focused uplink beam 344 includes channels 1–16, designated for satellite 320.

In this embodiment, each of satellites 316, 318, and 322 are provided 8 uplink channels for communication signals. Further, satellite 322 is provided 44 uplink channels for communication (22 via highly focused uplink beam 328 and 22 via highly focused uplink beam 344). Thus, in comparison with the system of FIG. 1, which requires a total of six ground stations to provide the same cumulative spectral bandwidth, the system of FIG. 6 only requires two ground stations.

Figure 8:
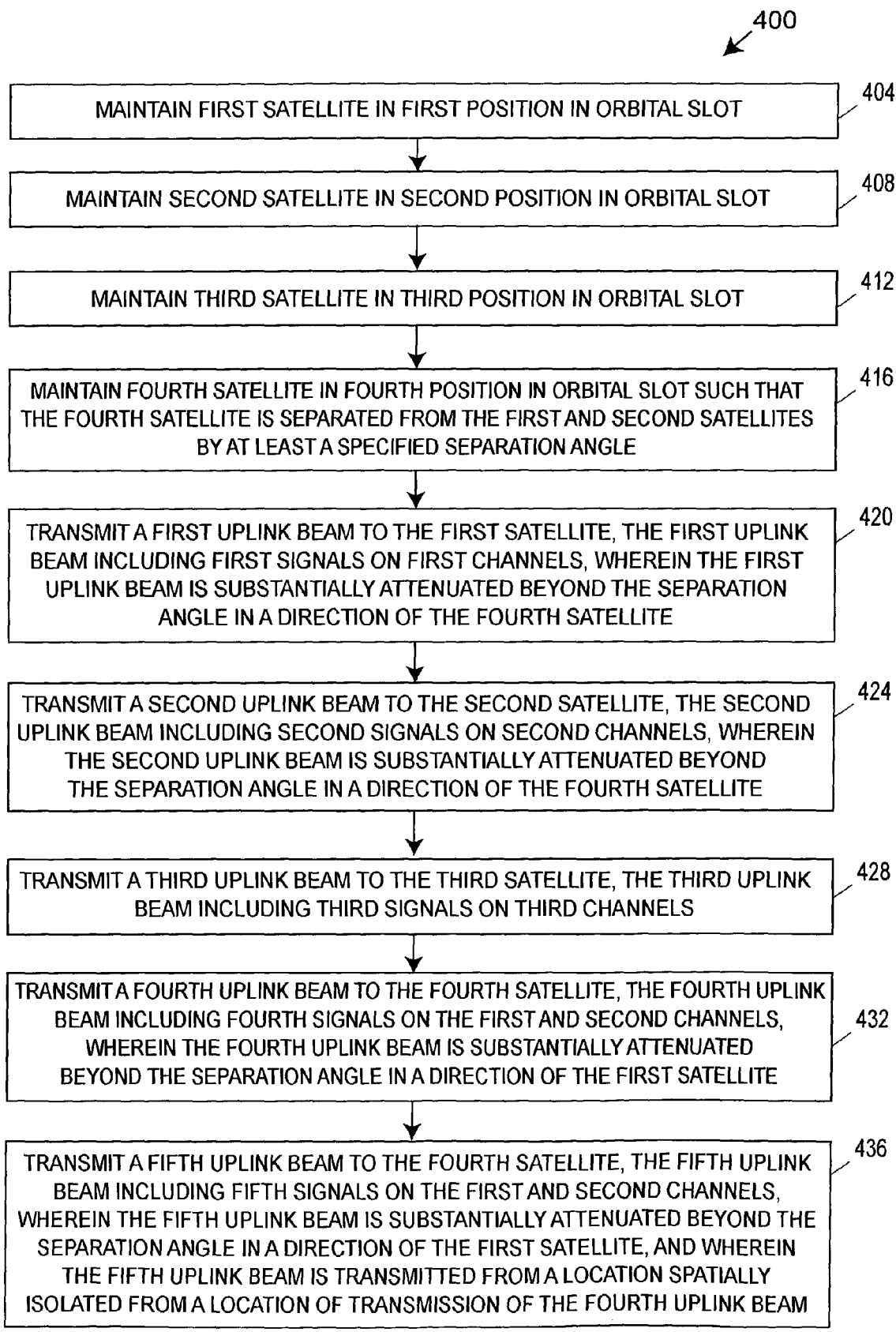
FIG. 8 is a simplified flow diagram of another embodiment of a method according to the present invention.

FIG. 8 is a simplified flow diagram illustrating one embodiment of a method 400 for transmitting data to multiple satellites according to the present invention. The flow of FIG. 8 will be described with reference to FIGS. 3, 6, and 7. In step 404, a first satellite is maintained in a first position in an orbital slot. For example, in the system 300 described with reference to FIGS. 3, 6, and 7, ground station 304*a* can maintain satellite 316 in position 100.85°, within orbital slot 101 West.

In step 408, a second satellite is maintained in a second position in the orbital slot, where the second position is proximate to the first position. For example, in system 300, ground station 304*a* can maintain satellite 318 in position 100.75°, within orbital slot 101 West.

In step 412, a third satellite is maintained in a third position in the orbital slot. For example, in system 300, ground station 304*a* can maintain satellite 322 in position 101.15°, within orbital slot 101 West.

In step 416, a fourth satellite is maintained in a fourth position in the orbital slot, such that the fourth satellite is separated from the first and second satellites by at least a specified separation angle. For example, in system 300, ground station 304*a* can maintain satellite 320 in position 101.25°, within orbital slot 101 West. As described above, this positioning maintains satellites 316 and 320 such that the worst case separation angle is 0.30°. Additionally, satellites 320 and 318 are also separated by a separation angle greater than 0.30°.

In step 420, a first highly focused uplink beam is transmitted to the first satellite, where the first highly focused uplink beam includes first communication signals on a first set of channels. Additionally, the first highly focused uplink beam is substantially attenuated beyond the separation angle in the direction of the fourth satellite. In system 300, a first highly focused uplink beam 324*a* can be transmitted to satellite 316 via antenna 308*a*. Highly focused uplink beam 324*a* can include a first set of channels. As described with reference to FIGS. 3 and 7, highly focused uplink beam 324*a* is substantially attenuated beyond 0.25° in the direction of satellite 320. On the other hand, highly focused uplink beam 324 may not be substantially attenuated as received by satellite 318.

In step 424, a second highly focused uplink beam is transmitted to the second satellite, where the second highly focused uplink beam includes second communication signals on a second set)of channels. Additionally, the second highly focused uplink beam is substantially attenuated beyond the separation angle in the direction of the fourth satellite. In system 300, a second highly focused uplink beam 324*b* can be transmitted to satellite 318 via antenna 308*c*. Highly focused uplink beam 324*b* can include the second set of channels. As described with reference to FIGS. 3 and 7, highly focused uplink beam 324*b* is substantially attenuated beyond 0.25° in the direction of satellite 320. On the other hand, highly focused uplink beam 324*b* may not be substantially attenuated as received by satellite 316.

In step 428, a third highly focused uplink beam is transmitted to the third satellite, where the third highly focused uplink beam includes third communication signals on a third set of channels. Additionally, the third highly focused uplink beam may be substantially attenuated beyond the separation angle in the direction of the second satellite; but need not be. In system 300, a third highly focused uplink beam 328*b* can be transmitted to satellite 322 via antenna 308*d*. Highly focused uplink beam 328*c* can include a third set of channels. As described with reference to FIGS. 3 and 7, highly focused uplink beam 328*b* may be substantially attenuated beyond 0.25° in the direction of satellite 318, but need not be. On the other hand, highly focused uplink beam 328*b* may not be substantially attenuated as received by satellite 320.

In step 432, a fourth highly focused uplink beam is transmitted to the fourth satellite, where the fourth highly focused uplink beam includes fourth communication signals on the first and second sets of channels. Additionally, the fourth highly focused uplink beam is substantially attenuated beyond the separation angle in the direction of the first satellite. In system 300, a fourth highly focused. uplink beam 328*a* can be transmitted to satellite 320 via antenna 308*b*. Highly focused uplink beam 328*a* can include the first set of channels and the second set of channels. As described with reference to FIGS. 3 and 7, highly focused uplink beam 328*a* is substantially attenuated beyond 0.25° in the direction of satellite 316. On the other hand, highly focused uplink beam 328*a* may not be substantially attenuated as received by satellite 322.

In optional step 436, a fifth highly focused uplink beam is transmitted to the fourth satellite, where the fifth highly focused uplink beam includes fifth communication signals on the first and second sets of channels. The fifth highly focused uplink beam is substantially attenuated beyond the separation angle in the direction of the first satellite. Additionally, the fifth highly focused uplink beam is transmitted from a location that is spatially separated from the location of the transmission of the fourth highly focused uplink beam. In system 300, a fifth highly focused uplink beam 344 can be transmitted to satellite 320 via antenna 340. Antenna 340 should be spatially isolated from antenna 308*b* such that satellite 320 can discriminate between highly focused uplink beam 328*a* and highly focused uplink beam 344. Highly focused uplink beam 344 can include the first and second sets of channels. As described with reference to FIGS. 3 and 7, highly focused uplink beam 344 is substantially attenuated beyond 0.25° in the direction of satellite 316.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A satellite-based communication system, comprising:
   a first satellite in an orbital slot, the first satellite having an associated receive antenna, wherein the first satellite is configured to receive signals in a first range of frequencies;
   a second satellite in the orbital slot, the second satellite having an associated receive antenna, wherein the second satellite is separated from the first satellite by at least a first separation angle, wherein the second satellite is configured to receive signals in the first range of frequencies;
   a first earth uplink antenna, located at a first earth location, capable of transmitting a first uplink beam at the receive antenna of the first satellite; and
   a second earth uplink antenna, collocated at the first earth location, capable of transmitting a second uplink beam at the receive antenna of the second satellite;
   wherein the first uplink beam includes first signals at the first range of frequencies, and wherein the second uplink beam includes second signals at the first range of frequencies;
   wherein the first uplink beam is substantially attenuated beyond the first separation angle in the direction of the second satellite, and wherein the second uplink beam is substantially attenuated beyond the first separation angle in the direction of the first satellite.

2. The satellite-based communication system of claim 1, wherein the receive antenna of the first satellite is capable of discriminating uplink beams from respective spatially separated earth antennas, the satellite communication system further comprising:
   a third earth uplink antenna, located at a second earth location spatially separated from the first earth location, capable of transmitting a third uplink beam at the receive antenna of the first satellite;
   wherein the third uplink beam includes third signals at the first range of frequencies;
   wherein the third uplink beam is substantially attenuated beyond the first separation angle in the direction of the second satellite.

3. The satellite-based communication system of claim 1, further comprising:
   a third satellite in the orbital slot, the third satellite having an associated receive antenna, wherein the third satellite is configured to receive signals in a second range of frequencies, wherein the third satellite is separated from the second satellite by at least the first separation angle;
   a third earth uplink antenna capable of transmitting a third uplink beam at the receive antenna of the third satellite, the third uplink beam including third signals at the second range of frequencies;
   wherein the second spot beam further includes fourth signals at the third range of frequencies.

4. The satellite-based communication system of claim 3, further comprising:
   a fourth satellite in the orbital slot, the fourth satellite having an associated receive antenna, wherein the fourth satellite is configured to receive signals in a third range of frequencies;
   a fourth earth uplink antenna capable of transmitting a fourth uplink beam at the receive antenna of the fourth satellite; the fourth uplink beam including fourth signals at the third range of frequencies.

5. The satellite-based communication system of claim 1, further comprising:
   a third satellite in the orbital slot, the third satellite having an associated receive antenna, wherein the third satellite is configured to receive signals in a second range of frequencies;
   a third earth uplink antenna capable of transmitting a third uplink beam at the receive antenna of the third satellite, the third uplink beam including third signals at the second range of frequencies;
   a fourth satellite in the orbital slot, the fourth satellite having an associated receive antenna, wherein the fourth satellite is configured to receive signals in a second range of frequencies, wherein the fourth satellite is separated from the third satellite by at least a second separation angle;
   a fourth earth uplink antenna capable of transmitting a fourth uplink beam at the receive antenna of the fourth satellite, the fourth uplink beam including fourth signals at the second range of frequencies;
   wherein the third uplink beam is substantially attenuated beyond the second separation angle in the direction of the fourth satellite, and wherein the fourth uplink beam is substantially attenuated beyond the second separation angle in the direction of the third satellite.

6. The satellite-based communication system of claim 1, further comprising:
   a third satellite in the orbital slot, the third satellite having an associated receive antenna, wherein the third satellite is configured to receive signals in a second range of frequencies;
   a third earth uplink antenna capable of transmitting a third uplink beam at the receive antenna of the third satellite, the third uplink beam including third signals at the second range of frequencies.

7. A system for transmitting data to a plurality of satellites, the system comprising:
   a first earth uplink antenna, located at a first earth location, capable of transmitting a first uplink beam at a receive antenna of a first satellite, the first satellite in a first position in an orbital slot; and
   a second earth uplink antenna, collocated at the first earth location, capable of transmitting a second uplink beam at a receive antenna of a second satellite, the second satellite in a second position in the orbital slot, wherein the second satellite is separated from the first satellite by at least a separation angle;
   wherein the first uplink beam includes first signals at a first range of frequencies, and wherein the second uplink beam includes second signals at the first range of frequencies;
   wherein the first uplink beam is substantially attenuated beyond the separation angle in the direction of the second satellite, and wherein the second uplink beam is substantially attenuated beyond the separation angle in the direction of the first satellite.

8. The system of claim 7, wherein the receive antenna of the first satellite is capable of receiving uplink beams from respective spatially separated earth antennas, the system further comprising:
  a third earth uplink antenna, located at a second earth location spatially separated from the first earth location, capable of transmitting a third uplink beam at the uplink antenna of the first satellite;
  wherein the third uplink beam includes third signals at the first range of frequencies;
  wherein the third uplink beam is substantially attenuated beyond the first separation angle in the direction of the second satellite.

9. The system of claim 7, further comprising a third earth uplink antenna capable of transmitting a third uplink beam at a receive antenna of a third satellite, wherein the third satellite is located in a third position in the orbital slot, wherein the third satellite is separated from the first satellite by at least a separation angle;
  wherein the third uplink beam includes third signals at a second range of frequencies, and wherein the first signals of the first uplink beam are further at the second range of frequencies;
  wherein the first uplink beam is substantially attenuated beyond the separation angle in the direction of the third satellite, and wherein the third uplink beam is substantially attenuated beyond the separation angle in the direction of the first satellite.

10. The system of claim 9, further comprising a fourth earth uplink antenna capable of transmitting a fourth uplink beam at a receive antenna of a fourth satellite, wherein the fourth satellite is located in a fourth position in the orbital slot;
  wherein the fourth uplink beam includes fourth signals at a third range of frequencies.

11. The system of claim 7, further comprising:
  a third earth uplink antenna capable of transmitting a third uplink beam at a receive antenna of a third satellite, wherein the third satellite is located in a third position in the orbital slot;
  a fourth earth uplink antenna capable of transmitting a fourth uplink beam at a receive antenna of a fourth satellite, wherein the fourth satellite is located in a fourth position in the orbital slot, wherein the fourth satellite is separated from the third satellite by at least the separation angle;
  wherein the third uplink beam includes third signals at a second range of frequencies, and wherein the fourth uplink beam includes fourth signals at the second range of frequencies;
  wherein the third uplink beam is substantially attenuated beyond the separation angle in the direction of the fourth satellite, and wherein the fourth uplink beam is substantially attenuated beyond the separation angle in the direction of the third satellite.

12. The system of claim 7, further comprising a third earth uplink antenna capable of transmitting a third uplink beam at a receive antenna of a third satellite, wherein the third satellite is located in a third position in the orbital slot;
  wherein the third uplink beam includes third signals at a second range of frequencies.

13. In a satellite-based communications network including a plurality of satellites, each satellite having a receive antenna, a method for transmitting data to the satellites, the method comprising:
  transmitting a first uplink beam at a receive antenna of a first satellite, wherein the first satellite is at a first position in an orbital slot, wherein a second satellite is at a second position in the orbital slot, wherein the second satellite is separated from the first satellite by at least a separation angle, wherein the first uplink beam is substantially attenuated beyond the separation angle in the direction of the second satellite, and wherein the first uplink beam includes first signals at a first range of frequencies;
  transmitting a second uplink beam at a receive antenna of the second satellite, wherein the second uplink beam is substantially attenuated beyond the separation angle in the direction of the first satellite, and wherein the second uplink beam includes second signals at the first range of frequencies.

14. The method of claim 13, wherein the receive antenna of the first satellite is capable of discriminating uplink beams from respective spatially separated earth uplink antennas, and wherein the first uplink beam is transmitted from a first earth uplink antenna located at a first earth location, the method further comprising:
  transmitting, from a second earth uplink antenna located at a second earth location spatially separated from the first earth location, a third uplink beam at the receive antenna of the first satellite, wherein the third uplink beam is substantially attenuated beyond the separation angle in the direction of the second satellite, and wherein the third uplink beam includes third signals at the first range of frequencies.

15. The method of claim 13, wherein a third satellite is located at a third position in the orbital slot, the method further comprising:
  transmitting a third uplink beam at a receive antenna of the third satellite, wherein the third uplink beam includes third signals at a second range of frequencies.

16. The method of claim 15, wherein the third satellite is separated from the second satellite by at least the separation angle;
  wherein the second signals of the second uplink beam are further at the second range of frequencies;
  wherein the third uplink beam is substantially attenuated beyond the separation angle in the direction of the second satellite, and wherein the second uplink beam is substantially attenuated beyond the separation angle in the direction of the third satellite.

17. The method of claim 15, wherein a fourth satellite is located at a fourth position in the orbital slot, and wherein the fourth satellite is separated from the first satellite by at least an angle greater than the separation angle, the method further comprising:
  transmitting a fourth uplink beam at a receive antenna of the fourth satellite, wherein the fourth uplink beam includes fourth signals at a third range of frequencies, wherein the fourth uplink beam is substantially attenuated beyond the separation angle in the direction of the first satellite;
  wherein the first signals of the first uplink beam are further at the fourth range of frequencies.

18. The method of claim 15, wherein a third satellite is located at a third position in the orbital slot, wherein a fourth satellite is located at a fourth position in the orbital slot, and wherein the fourth satellite is separated from the third satellite by at least the separation angle, the method further comprising:
  transmitting a third uplink beam at a receive antenna of the third satellite, wherein the third uplink beam includes third signals at a second range of frequencies, wherein the third uplink beam is substantially attenuated beyond the separation angle in the direction of the fourth satellite;

transmitting a fourth uplink beam at a receive antenna of the fourth satellite, wherein the fourth uplink beam includes fourth signals at the second range of frequencies, wherein the fourth uplink beam is substantially attenuated beyond the separation angle in the direction of the third satellite.

19. The method of claim 13, further comprising:

transmitting control signals to the first satellite for maintaining the first satellite in the first position in the orbital slot; and transmitting control signals to the second satellite for maintaining the second satellite in the second position in the orbital slot.

* * * * *